(12) United States Patent
Gupta et al.

(10) Patent No.: US 11,700,289 B2
(45) Date of Patent: Jul. 11, 2023

(54) USER EXPERIENCE ANALYSIS FOR MULTI-CHANNEL REMOTE DESKTOP ENVIRONMENTS

(71) Applicant: Citrix Systems, Inc., Fort Lauderdale, FL (US)

(72) Inventors: Rahul Gupta, Bangalore (IN); Dhawal Patel, Bangalore (IN); Divya Ranjan, Bangalore (IN); Himanshu Pandey, Bangalore (IN); Pn Prathima, Bangalore (IN); Rupak Das, Bangalore (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 6 days.

(21) Appl. No.: 17/368,109

(22) Filed: Jul. 6, 2021

(65) Prior Publication Data

US 2022/0385699 A1 Dec. 1, 2022

(30) Foreign Application Priority Data

May 31, 2021 (IN) .............................. 202141024138

(51) Int. Cl.
| | | |
|---|---|---|
| *H04L 65/1069* | (2022.01) | |
| *H04L 67/141* | (2022.01) | |
| *H04L 65/401* | (2022.01) | |
| *H04L 67/142* | (2022.01) | |
| *G06F 9/451* | (2018.01) | |

(52) U.S. Cl.
CPC ........ *H04L 65/1069* (2013.01); *H04L 65/401* (2022.05); *H04L 67/141* (2013.01); *H04L 67/142* (2013.01); *G06F 9/452* (2018.02)

(58) Field of Classification Search
None
See application file for complete search history.

(56) References Cited

U.S. PATENT DOCUMENTS

| | | | |
|---|---|---|---|
| 10,230,601 B1 * | 3/2019 | Qin ......................... | H04L 43/08 |
| 2004/0068627 A1 * | 4/2004 | Sechrest ............... | G06F 12/121 |
| | | | 711/E12.071 |
| 2013/0054751 A1 * | 2/2013 | Ponsford ............. | H04L 43/0852 |
| | | | 709/219 |
| 2014/0229527 A1 * | 8/2014 | Bidarkar .................. | G06F 9/54 |
| | | | 709/203 |
| 2016/0188356 A1 * | 6/2016 | Ramasamy ............. | G06F 9/452 |
| | | | 718/1 |

(Continued)

*Primary Examiner* — Kevin T Bates
*Assistant Examiner* — Dae Kim

(57) ABSTRACT

Methods and systems for analysis of a plurality of channels that provide a remote desktop session are described herein. Channel metrics for each of a plurality of communication channels may be received. Each of the plurality of communication channels may be configured to deliver, to a computing device and via a network, different aspects of a remote desktop session. A plurality of channel scores may be determined for each communication channel of the plurality of communication channels. Based on the plurality of channel scores, an aggregate score may be determined. Based on the aggregate score satisfying a threshold, a notification may be transmitted. For example, an indication of one or more executable scripts predicted to improve a performance of one or more of the plurality of communication channels may be transmitted.

12 Claims, 7 Drawing Sheets

(56) References Cited

U.S. PATENT DOCUMENTS

| | | | |
|---|---|---|---|
| 2018/0284976 A1* | 10/2018 | Kakaraparthi | ... G06Q 10/06393 |
| 2019/0230027 A1* | 7/2019 | Murgia | ................. H04L 45/121 |
| 2019/0342426 A1* | 11/2019 | Momchilov | ............ H04L 67/42 |
| 2020/0159547 A1* | 5/2020 | Momchilov | ........ G06F 9/45558 |
| 2020/0162356 A1* | 5/2020 | Momchilov | ........ H04L 12/4633 |
| 2020/0382621 A1* | 12/2020 | Moreira | .............. H04L 67/2809 |
| 2020/0394063 A1* | 12/2020 | Kelly | .................... G06F 9/5088 |

* cited by examiner

We have detected that your remote session is performing poorly. Would you like to lower the resolution of your session to improve performance?

YES    NO (701)

FIG. 7A

We have detected that your remote session is performing poorly. We will close background applications in your session to improve performance.

We have detected that your remote session is performing poorly. We are taking steps to improve the performance. You may notice a temporary decrease in session quality.

USER EXPERIENCE ANALYSIS FOR MULTI-CHANNEL REMOTE DESKTOP ENVIRONMENTS

CROSS-REFERENCE TO RELATED APPLICATIONS

This application claims priority to Indian Provisional Application No. 202141024138, entitled User Experience Analysis for Multi-Channel Remote Desktop Environments, filed May 31, 2021.

FIELD

Aspects described herein generally relate to computer networking, remote computer access, virtualization, enterprise mobility management, and hardware and software related thereto. More specifically, one or more aspects describe herein provide for analyzing and adapting to channel metrics for a plurality of communication channels which collectively provide a remote desktop session.

BACKGROUND

Computing devices might be provided remote access to an application executing on another computing device using a remote desktop session. For example, a user on their laptop might remotely access an e-mail application that executes on a remote, centralized server. As part of providing such a remote desktop session, various communication channels might be instantiated between the two computing devices. For example, one communication channel might transmit video data, another might transmit audio data, and another might transmit data related to Universal Serial Bus (USB) communications, and yet another might relate to printer communications. In this manner, each channel might handle a different portion of the collective remote desktop session.

The complexity of, and differences between, the different communication channels might make it prohibitively difficult to analyze the implications, on user experience, of various deficiencies on those channels. For example, latency in a video channel might be more readily noticed than latency in a USB channel. As another example, latency in both a video channel and an audio channel might be tolerable, but differences in the latencies between the two channels might result in a poor user experience because the video and audio might appear to be disconnected. Moreover, channel performance might be partially dependent on the way a remote desktop session is used: for example, video channel delay might be unacceptable in a live videoconferencing situation, but printer channel delay might be tolerable during videoconferencing.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards analyzing channel metrics of, and reacting or adapting to the channel metrics of, a plurality of communications channels which collectively provide a remote desktop session.

As will be described further herein, a computing device may receive channel metrics for each of a plurality of communications channels. Each of the plurality of communication channels might be configured to deliver, to the computing device and via a network, different aspects of a remote desktop session. For example, one communication channel might provide video data, another might provide audio data, and further others might provide USB, keyboard, and/or printer data. Each of the plurality of communication channels may be a logical communication channel over the Internet. For each communication channel of the plurality of communication channels, a plurality of channel scores may be determined. Such channel scores may be determined by determining a channel score that indicates a performance of the communication channel and weighting the channel score based on a weighting value. Such channel scores might be collected using a remote session display application that displays the remote desktop session. Determining the channel score may comprise comparing one or more performance metrics of a communication channel to a standard of performance metrics for the communication channel. The weighting value may correspond to an importance of the communication channel in providing the remote desktop session to a user, a time period during which the remote desktop session is provided, and/or one or more applications executing in the remote desktop session. The weighting value may be further based on user experience preferences associated with a user of the remote desktop session. An aggregate score may be determined based on the plurality of channel scores. The aggregate score might be further based on a user experience score for the remote desktop session. Based on that aggregate score satisfying a threshold, a notification might be transmitted, and/or an adaptive measure may be instituted. For example, transmitting the notification might comprise determining, based on the plurality of channel scores, one or more executable scripts predicted to improve a performance of one or more of the plurality of communication channels, and transmitting an indication of the one or more executable scripts. The executable scripts might be configured to modify a quality of the remote desktop session, modify execution of one or more applications in the remote desktop session, and/or lower a bitrate of communications delivered via one or more of the plurality of communication channels. Additionally and/or alternatively, transmitting the notification might comprise determining, based on the plurality of channel scores, one or more operating parameters of the remote desktop session which can be modified to improve a performance of one or more of the plurality of communication channels, and causing the computing device to display an indication of the one or more operating parameters. For example, the resolution of the remote desktop session and/or the quantity of applications executing in the remote desktop session may be changed. The computing device might additionally and/or alternatively train, based on data that indicates performance metrics for a history of remote desktop sessions, a machine learning model to output, based on input data comprising one or more channel scores for a first remote desktop session, one or more recommended modifications for the first remote desktop session. The computing device may then receive, from the machine learning model and based on the plurality of channel scores, one or more first recommended modifications for the remote desktop session. In such a circumstance, transmitting the notification may comprise transmitting an indication of the one or more first recommended modifications.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein:

FIG. 7A shows a notification relating to lowering the resolution of a remote desktop session in accordance with one or more illustrative aspects described herein.

FIG. 7B shows a notification relating to closing background applications in a remote desktop session in accordance with one or more illustrative aspects described herein.

FIG. 7C shows a notification relating to remote desktop session performance in accordance with one or more illustrative aspects described herein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards improving remote desktop sessions by analyzing individual channels of a plurality of channels used to provide those remote desktop sessions. A remote desktop session may be provided via a plurality of different channels: for example, a first channel might facilitate video communications, a second channel might facilitate audio communications, a third channel might facilitate USB communications, a fourth channel might facilitate keyboard and/or mouse data communications, and a fifth channel might facilitate printer-related communications. Each of these channels is different, and a user's experience of a remote desktop session might be differently impacted based on changes to those channels. For example, lag in a video channel might be undesirable because it may negatively impact a user's experience of a remote desktop session, but lag in a printer channel might not even be noticed by a user.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "connected," "coupled," and similar terms, is meant to include both direct and indirect connecting and coupling.

Computing Architecture

Figure 1:
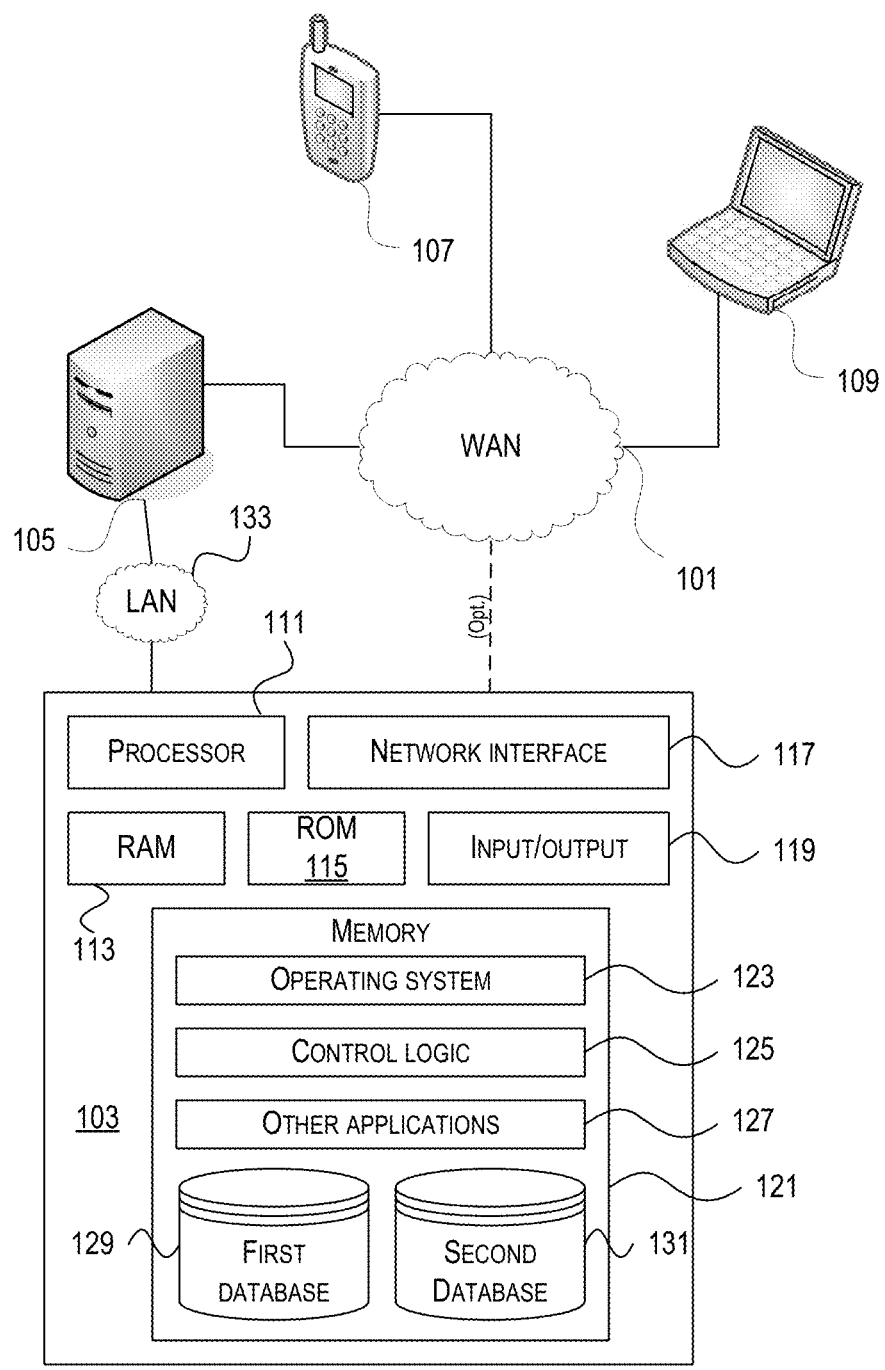
FIG. 1 depicts an illustrative computer system architecture that may be used in accordance with one or more illustrative aspects described herein.

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic 125 may also be referred to herein as the data server software 125. Functionality of the data server software 125 may refer to operations or decisions made automatically based on rules coded into the control logic 125, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database 129 may include the second database 131 (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, solid state storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
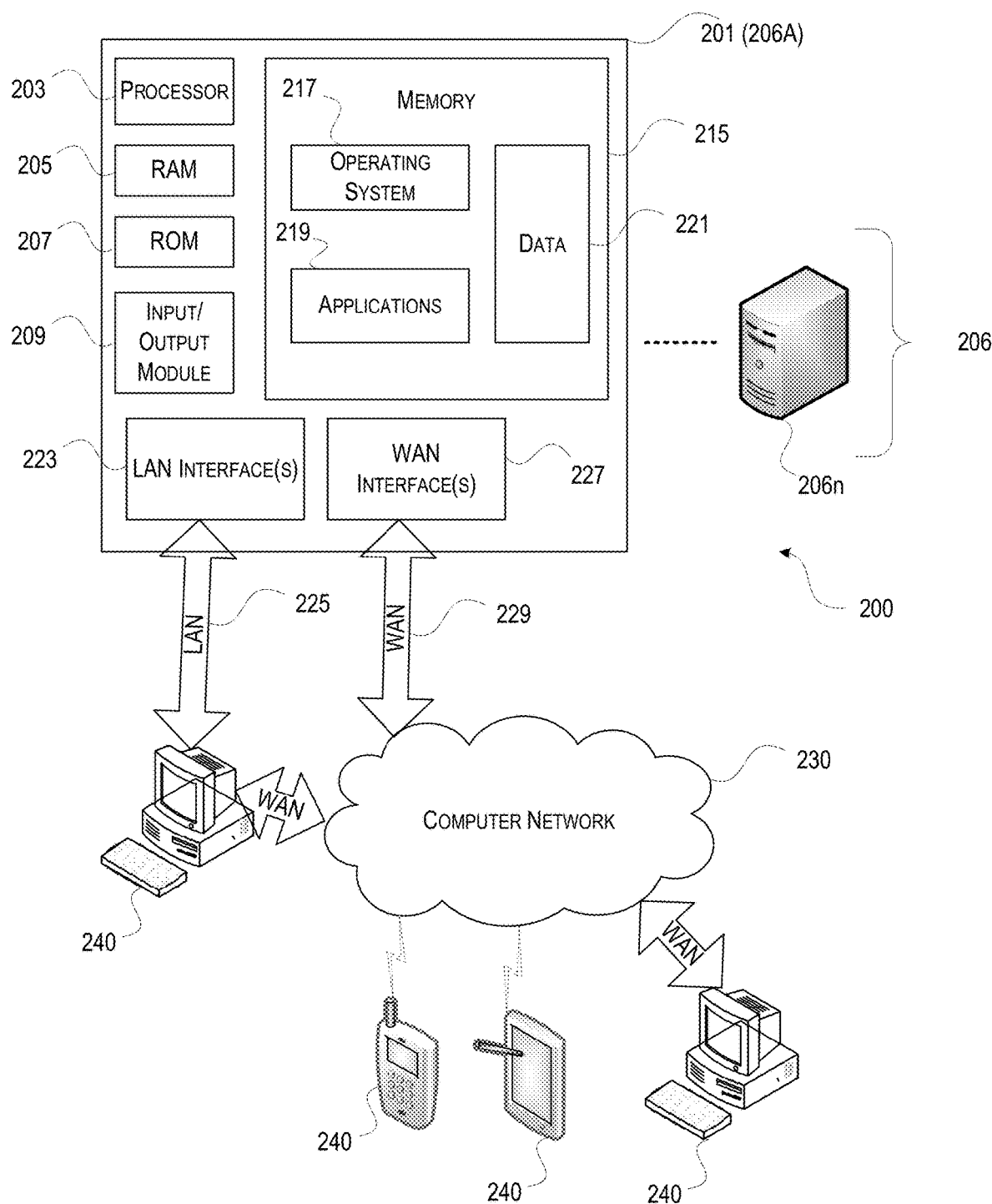
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206a in a single-server or multi-server desktop virtualization system (e.g., a remote access or cloud system) and can be configured to provide virtual machines for client access devices. The computing device 201 may have a processor 203 for controlling overall operation of the device 201 and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices and/or client machines). The terminals 240 may be personal computers, mobile devices, laptop computers, tablets, or servers that include many or all of the elements described above with respect to the computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem or other wide area network interface 227 for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b (not shown), and responds to the request generated by the client machine 240 with a response from the second server 206b (not shown.) First server 206a may acquire an enumeration of applications available to the client machine 240 as well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Figure 3:
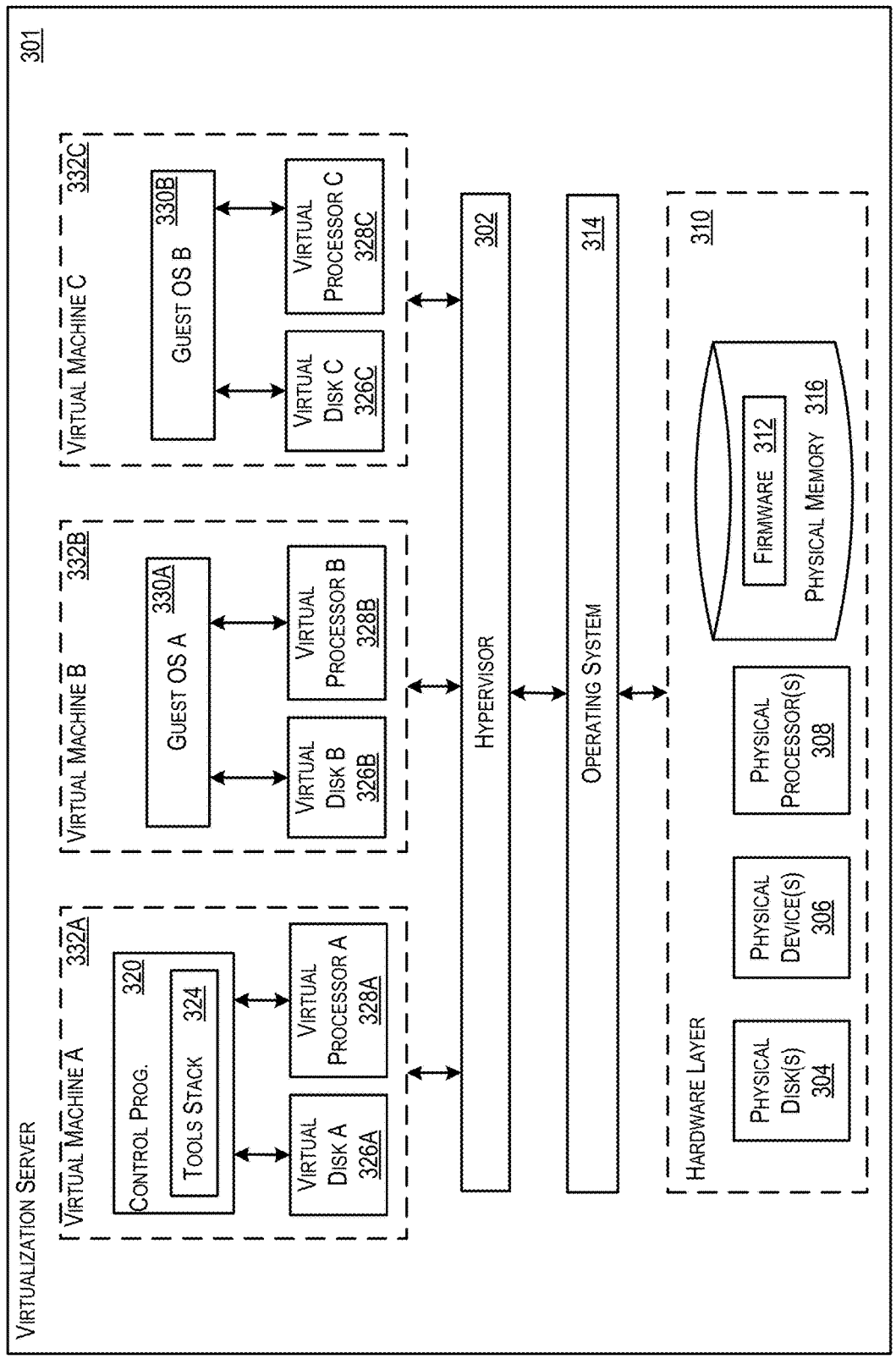
FIG. 3 depicts an illustrative virtualized system architecture that may be used in accordance with one or more illustrative aspects described herein.

FIG. 3 shows a high-level architecture of an illustrative desktop virtualization system. As shown, the desktop virtualization system may be single-server or multi-server system, or cloud system, including at least one virtualization server 301 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

A computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308, and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more physical memory 316. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor executes within an operating system 314 executing on the virtualization server 301. Virtual machines may then execute at a level above the hypervisor 302. In some embodiments, the Type 2 hypervisor may execute within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316, and any other component included in hardware layer 310 of the virtualization server 301. Hypervisor 302 may be used to emulate virtual hardware, partition physical hardware, virtualize physical hardware, and/or execute virtual machines that provide access to computing environments. In still other embodiments, hypervisor 302 may control processor scheduling and memory partitioning for a virtual machine 332 executing on virtualization server 301. Hypervisor 302 may include those manufactured by VMWare, Inc., of Palo Alto, Calif.; HyperV, VirtualServer or virtual PC hypervisors provided by Microsoft, or others. In some embodiments, virtualization server 301 may execute a hypervisor 302 that creates a virtual machine platform on which guest operating systems may execute. In these embodiments, the virtualization server 301 may be referred to as a host server. An example of such a virtualization server is the Citrix Hypervisor provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create a virtual machine 332.

In other embodiments, the hypervisor 302 may execute a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may present at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, may imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, may provide each virtual machine 332 with a unique virtual view of the physical hardware, memory, processor, and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor, and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided, and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided, and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
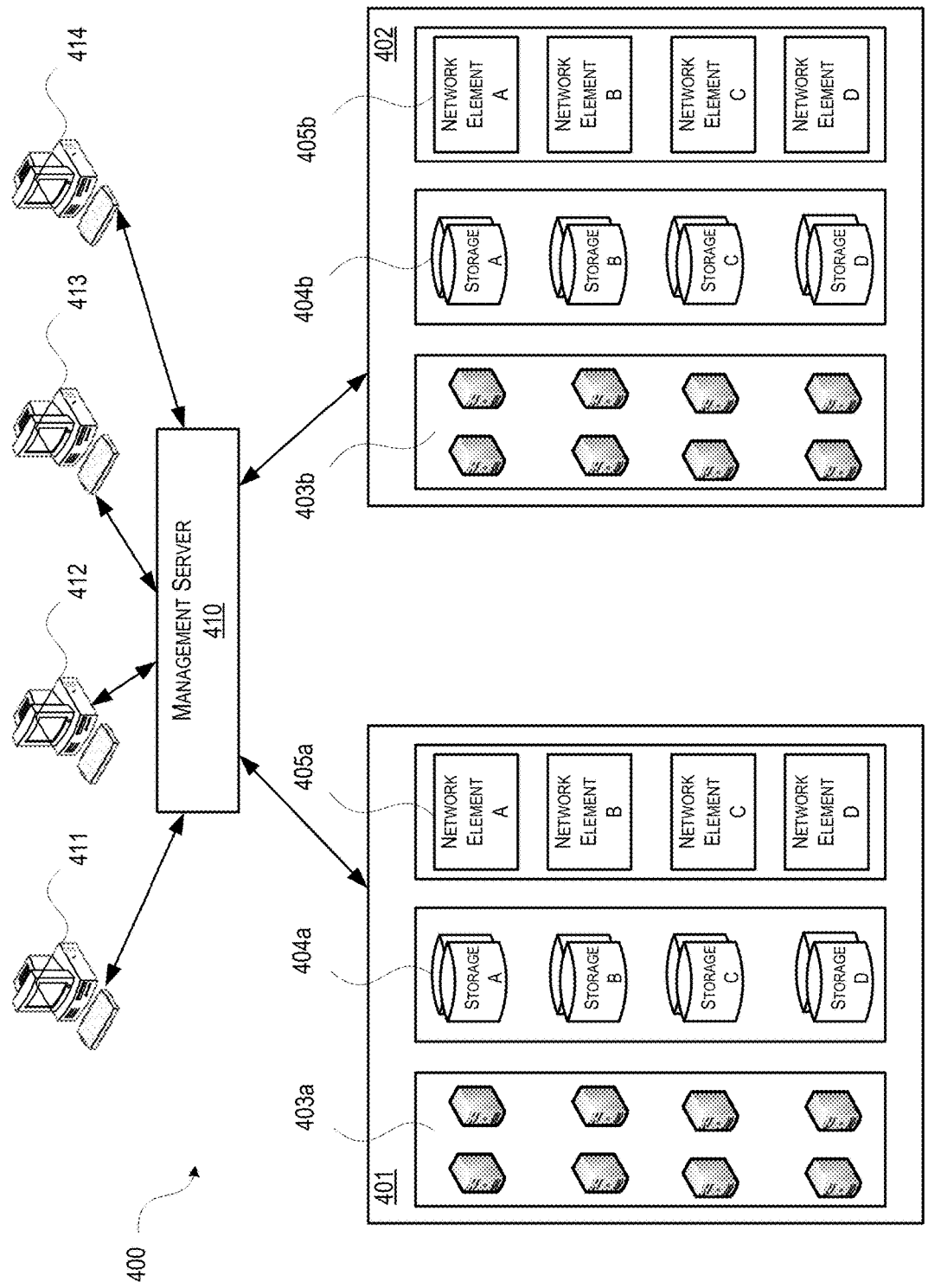
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403a-403b (generally referred herein as "host servers 403"), storage resources 404a-404b (generally referred herein as "storage resources 404"), and network elements 405a-405b (generally referred herein as "network resources 405")) of the cloud system.

Management server 410 may be implemented on one or more physical servers. The management server 410 may run, for example, Citrix Cloud by Citrix Systems, Inc. of Ft. Lauderdale, Fla., or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system 400. For example, the management server 410 may provide a set of application programming interfaces (APIs) and/or one or more cloud operator console applications (e.g., web-based or standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or some other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, to different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management server 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

Multi-Channel Analysis

Figure 5:
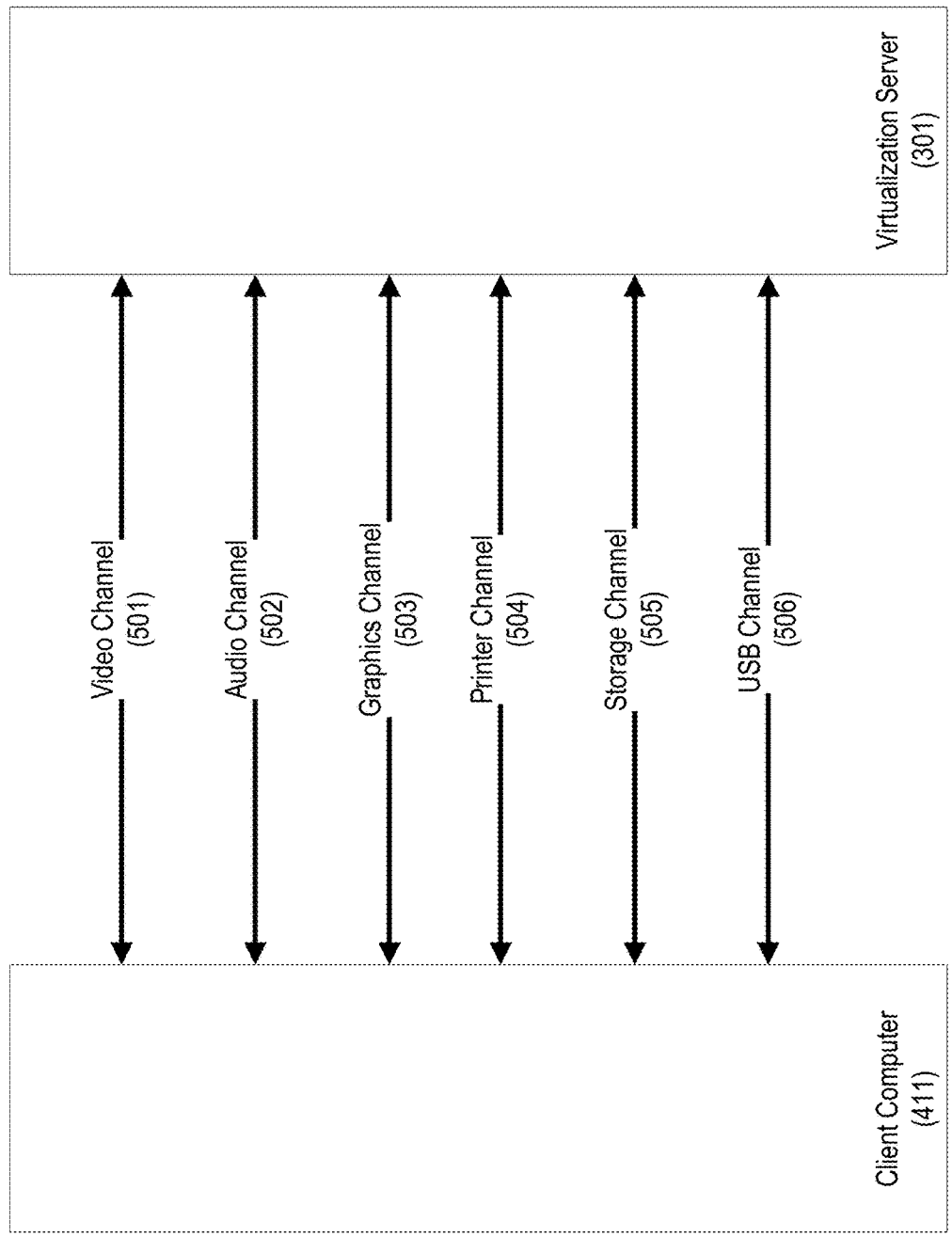
FIG. 5 depicts an illustrative plurality of channels between a client computer and a virtualization server in accordance with one or more illustrative aspects described herein.

FIG. 5 depicts a plurality of communication channels between the client computer 411 and the virtualization server 301. A video channel 501, an audio channel 502, a graphics channel 503, a printer channel 504, a storage channel 505, and a USB channel 506 are shown connecting the client computer 411 and the virtualization sever 301. The particular devices shown in FIG. 5 and the particular communications channels shown in FIG. 5 are illustrative: any type of computing devices and/or communication channels may be implemented in accordance with the disclosure herein. For example, the USB channel 506 need not be used, and the client computer 411 may be a similar or entirely different computing device.

Communications channels, such as those depicted in FIG. 5, may be physical and/or virtual connections between two devices, such as the client computer 411 and the virtualization server 301. For example, the communications channels depicted in FIG. 5 may be virtual channels over the Internet or a similar network. The communications channels need not be via the same network. For example, the video channel 501 might be over a wired network, whereas the USB channel 506 might be via a wireless network. The channels need not have the same protocol, bandwidth, or the like. For example, the video channel 501 might use a first protocol and have a significant amount of bandwidth, whereas the USB channel 506 might use a second protocol and have relatively little bandwidth.

The video channel 501 may be configured to transmit video between the computing devices. In many instances, this video may be transmitted from the virtualization server 301 to the client computer 411. For example, the video channel 501 might be configured to transmit, to the client computer 411, video from the virtualization server 301 that corresponds to one or more applications executing on the virtualization server 301. That said, the client computer 411 might also transmit video (e.g., web camera output) to the virtualization server 301 via the video channel 501.

The audio channel 502 may be configured to transmit audio between the computing devices. For example, the client computer 411 might transmit microphone audio to the virtualization server 301. Additionally and/or alternatively, the virtualization server 301 might transmit audio, from one or more applications executing in a remote desktop session, to the client computer 411.

The graphics channel 503 may be configured to transmit graphics data between the computing devices. For example, the client computer 411 might transmit an image from a clipboard to the virtualization server 301. As another example, the virtualization server 301 might transmit images of static user interface elements to the client computer 411.

The printer channel 504 may be configured to handle communications related to a printer. For example, the client computer 411 and/or the virtualization server 301 might be communicatively coupled to a printer, and either device might transmit printer instructions to the printer via the printer channel 504.

The storage channel 505 may be configured to manage transmissions between the computing devices relating to file storage. For example, the storage channel 505 might allow a client computer 411 to store a file on storage of the virtualization server 301, and/or might allow the virtualization server 301 to store a file on storage of the client computer 411.

The USB channel 506 may be configured to manage transmissions between the computing devices relating to USB communications. One or both of the client computer 411 and the virtualization server 301 may be communicatively coupled to a USB device. Using the USB channel 506, either device might be configured to receive and transmit data to such a USB device. For example, the client computer 411 might comprise a USB port, an input device (e.g., a keyboard, a mouse, a gamepad) might be connected to that USB port, and the virtualization server 301 may be capable of sending data to, and receiving data from, that input device via the USB channel 506.

The channels shown in FIG. 5 are illustrative, and might be combined, separated, and/or modified as desired. For example, the video channel 501 and the graphics channel 503 might be merged, and/or the graphics channel 503 might be omitted. The availability and/or use of channels might depend, at least in part, on user preferences. For example, the printer channel 504 might be omitted entirely based on an indication, by a user of the client computer 411, that the user does not want to make their printer available to applications executing in a remote desktop session on the virtualization server 301.

Each channel associated with a remote desktop session (e.g., the channels shown in FIG. 5) may be associated with a different importance in providing a remote desktop session to a user. For example, the video channel 501 might have a high level of importance for a remote desktop session, but the printer channel 504 might have a relatively lower level of importance. The importance of any given channel might depend on applications executing in a remote desktop session. For example, the printer channel 504 might be considered important when a user is executing a word processing application in a remote desktop session, but less important when the user is executing a video conferencing application in the remote desktop session. As another example, the audio channel 502 might not be considered important unless it is actively used (e.g., to listen to music or a conversation), as other sounds (e.g., conventional operating system sounds) might be muted by the user. The importance might additionally and/or alternatively be based on operating parameters of the client computer 411. For example, if the client computer 411 has no speakers, then the audio channel 502 might not have any importance in the user experience of a remote desktop session. As another example, if the client computer 411 is configured with security settings that limit remote access to USB devices, the USB channel 506 might have little importance in providing a user a remote desktop environment.

Each channel might be associated with a standard of performance metrics. Broadly, each channel might have a standard which defines various levels of performance of that channel. For example, the video channel 501 might be associated with a variety of standards of performance metrics based on different resolutions. Along those lines, the required bandwidth and latency for providing high definition video content might be different than the required bandwidth and latency for providing standard definition video content. As another example, the audio channel 502 might have different standards of performance (e.g., bandwidth thresholds, latency thresholds) based on whether music is being played, a user is using a video conferencing application in a remote desktop session, or the like.

Figure 6:
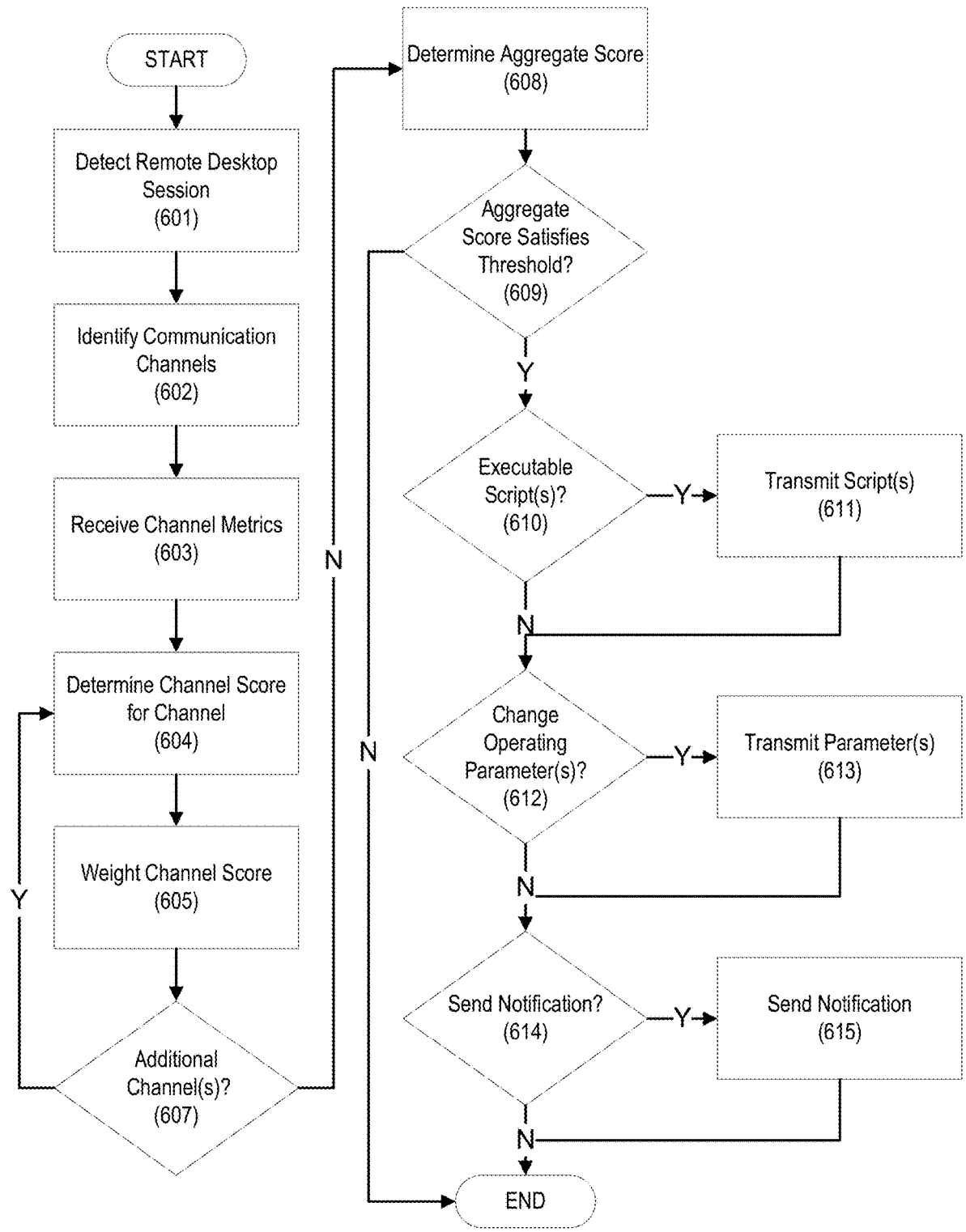
FIG. 6 is a flow chart depicting steps for determining channel scores in accordance with one or more illustrative aspects described herein.

FIG. 6 depicts a flow chart for determining an aggregate score for a plurality of channels and taking actions based on that aggregate score. The steps depicted in FIG. 6 may be performed by a computing device, such as the client computer 411, the virtualization server 301, or another computing device having one or more processors and memory storing instructions that, when executed by the one or more processors, cause performance of any of the steps of FIG. 6. For the sake of simplicity, when discussing FIG. 6, steps will be described as performed by a computing device; however, multiple computing devices (e.g., a network of servers) may collectively perform the steps depicted in FIG. 6. Moreover, any of the steps of FIG. 6 may be rearranged, merged, or omitted as desired.

In step 601, a computing device may detect a remote desktop session. The remote desktop session may be all or portions of a remote desktop session implemented by the virtualization server 301, and may execute in whole or in part on a virtual machine (e.g., the virtual machine A 332A). The remote desktop session may be established between a server (e.g., the virtualization server 301) and one or more client devices (e.g., the client computer 411). Detecting the remote desktop session may comprise querying a server (e.g., the virtualization server 301) and/or a client device (e.g., the client computer 411) to, for example, detect whether a remote desktop display application is currently displaying a remote desktop session.

In step 602, a plurality of communication channels may be identified. The communication channels might be associated with the remote desktop session. The communication channels may be the same or similar as the channels discussed with respect to FIG. 5. The communication channels might be identified by querying a server (e.g., the virtualization server 301) and/or a client device (e.g., the client computer 411) for information about the one or more channels, analyzing communications by a remote desktop display application, or the like. In instances where step 602 is performed by the remote desktop display application itself, the application may have stored (e.g., in memory) information about the channels used.

In step 603, channel metrics for each of the identified plurality of channels might be received. The channel metrics may be any objective or subjective measurement of performance of a channel. Examples of objective metrics of a channel may include the bandwidth of a channel, the latency of a channel, the percentage of time the channel is used, or the like. Examples of subjective metrics of a channel may include whether a user has indicated (e.g., in a user interface) an issue with the channel (e.g., indicating in a troubleshooting application that video is slow, indicating that the video channel 501 may be poorly performing). The channel metrics might be collected via a remote desktop display application that displays the remote desktop session. For example, the remote desktop display application might execute a service which periodically collects channel metrics for each of the plurality of channels.

Step 604 and step 605 may be performed for each channel of the plurality of channels identified in step 602. In step 604, a channel score might be determined for a channel of the plurality of channels. The channel score may be based on the channel metrics received in step 603. For example, a channel might be assigned a low channel score based on a determination that the channel has low bandwidth and/or a high amount of latency. The channel score may thereby reflect an objective and/or subjective evaluation of the performance of a communication channel (e.g., in providing the remote desktop session).

Determining the channel score may comprise comparing the one or more channel metrics to a standard of performance metrics for a communication channel. As discussed above with respect to FIG. 5, different communication channels might be associated with different standards. For example, a video channel (e.g., the video channel 501) might have a standard of performance associated with providing video content at a particular resolution and/or at a particular frame rate. As another example, a printer channel (e.g., the printer channel 504) might have a different standard of performance associated with regular use of the printer to print in color as compared to occasional use of the printer to print in black and white. The comparison may comprise determining how closely the metrics indicate that the channel is operating in accordance with the standard. For example, a low channel score might be assigned to a channel with a bandwidth significantly lower than the bandwidth specified by the channel's standard of performance. Such a comparison may result in a percentage value: for example, if the standard requires 500 kpbs but a channel performs at 250 kbps, then the channel score might indicate that the channel is performing at a value of fifty percent.

As just one particularized example of a standard of performance metrics, a three-tier standard might be established for the audio channel 502. A high quality (default) tier might correspond to a bitrate of 100 kbps for playback and 70 kbps for microphone capture, with two audio channels for audio playback and one channel for microphone capture. A medium quality tier, recommended for voice communications, might correspond to a bitrate of 16 kbps for playback and 16 kbps for microphone capture, with one audio channel for playback and one audio channel for capture. A low quality tier might correspond to a bitrate of 11 kbps for playback and 11 kbps for microphone capture, with one audio channel for playback and one audio channel for capture. One of these tiers might be selected based on how a remote desktop environment is being used. Then, a score for the audio channel might be calculated using the following equation:

$$score_{audio} = \sum_{i=0}^{n} \mathcal{F}(averagebandwithusage - thresholdbandwidth)$$

Where i is the number of audio events, averagebandwidthusage is the average bandwidth for the audio channel, and thresholdbandwidth is the threshold bandwidth value for the particular tier.

In step 605, the channel score may be weighted based on a weighting value. The weighting value may be based on an importance of the communication channel in providing a remote desktop session to a user. For example, the video channel 501 might be weighted as more important than the USB channel 506, as the former is likely to be noticed more (and used more) by a typical user of a remote desktop session. As another example, the printer channel 504 might be assigned a low priority, as delays in the channel might not be readily noticed by a typical user of a remote desktop session. The weighting value may be based on one or more applications executing in a remote desktop session. For example, the video channel 501 might be considered more important than the audio channel 502 when a user is executing a word processing application in a remote desktop session, as such applications rarely use and/or require audio. As another example, the audio channel 502 might be assigned a higher priority if the user is, in the remote desktop session, conducting a voice call using a communications application. The weighting value may be based on a time period during which the remote desktop session is provided. For example, certain channels (e.g., the printer channel 504) might be weighted as relatively more important during work hours as compared to other times. As another example, channels might be weighted differently during the weekend as compared to during the week because, for example, a user might be more likely to consume entertainment media during the weekend (and thus the importance of the audio channel 502 might be relatively higher). The weighting value might be associated with user experience preferences associated with a user of the remote desktop session. For example, a user that typically keeps their speakers muted (and/or uses a computing device without speakers) might weight the audio channel 502 very low or discount its performance entirely. As another example, a user that often uses videoconferencing applications in a remote desktop session might indicate that both the video channel 501 and the audio channel 502 as relatively important.

As a particular example, weighting values might be set by an administrator based on a broad set of priorities for remote desktop environments. For example, the below table comprises illustrative weighting values.

TABLE 1

| Channel | Weight |
| --- | --- |
| Audio | 0.5 |
| Video | 0.4 |
| Graphics | 0.3 |
| USB | 0.2 |
| Printer | 0.1 |

The channel score need not be weighted in all instances. Such weighting might be at the discretion of, e.g., an administrator. For example, some enterprises might find it valuable to more highly weight certain channels (e.g., the video channel 501) over others (e.g., the audio channel 502) based on an intended use of remote desktop sessions by employees.

In step 607, it is determined whether additional channels have not yet had a channel score determined. In other words, steps 605-607 act as a loop for each channel of the plurality of channels identified in step 602. If one or more channels have not yet been provided a channel score, the flow chart proceeds back to step 604. Otherwise, the flow chart proceeds to step 608.

In step 608, an aggregate score might be determined. The aggregate score may be based on each of the channel scores determined in 604, whether or not such scores were weighted in step 605. The aggregate score might be an indication of the overall performance of the remote desktop session, taking into account the individualized performance of each of the plurality of channels. For example, the aggregate score might be an average of weighted channel scores, might be a multi-factorial representation of the performance of the remote desktop session for different purposes, or the like.

The aggregate score might take into account information other than the channel scores, such as a user experience score. Some applications, such as remote desktop display application, may be configured to determine a user experience score. Such user experience scores might be based on, for example, whether a video stream from a server appears to lag and/or stutter, whether a user has expressed frustration with a remote desktop session (by, e.g., selecting a troubleshooting button in a user interface), or the like. Such user experience scores may thereby provide an additional data point to take into account as part of determining the aggregate score. For example, user experience scores might be calculated based on one or more of: a duration of a session, a round trip time, the occurrence of one or more connection failures, and/or whether one or more aspects of a remote desktop session had to reconnect.

For example, the aggregate score might be calculated in step 608 by summing weighted channel scores:

$$score_{aggregate} = \sum_{k=1}^{n}(S_k)$$

In this example, $S_k$ represents the weighted channel score, and n represents the total number of channels. This aggregate score might then be added to the aforementioned user experience score as follows:

Total Score=$score_{aggregate}$+($W$*$score_{userexperience}$)

Where W represents a weighting value which might be defined by an administrator to, e.g., appropriately scale the user experience score based on the aggregate score.

In step 609, it may be determined whether the aggregate score satisfies a threshold. The threshold may define poor performance of the remote desktop session. For example, the aggregate score might satisfy the threshold if the aggregate score is sufficiently low so as to indicate that the remote desktop session is performing poorly. If the aggregate score satisfies the threshold, the flow chart may proceed to step 610. Otherwise, the flow chart ends.

The following steps (step 610 through step 615) describe various ways in which adaptive measures might be taken based on an aggregate score satisfying a threshold. The examples provided in FIG. 6 focus on various transmissions which might cause performance of those adaptive measures on the same or a different computing device. That said, transmitting the notification need not merely indicate transmitting a message to another computing device. Rather, as will be described in detail, transmitting a notification might comprise transmitting an instruction to another application, causing an application on the same computing device to perform one or more steps (e.g., execute a script), or the like.

In step 610, it may be determined whether one or more executable scripts should be executed. The one or more executable scripts may be predicted to improve a performance of one or more of a plurality of communication channels. For example, the one or more executable scripts might be executed by a server (e.g., the virtualization server 301) to cause the server to use more memory, to move one or more virtual machines over to a separate server, to prevent additional virtual machines from being instantiated on the server, or the like. As another example, the one or more executable scripts might be executed by a client (e.g., the client computer 411) to cause the client to close applications other than the remote session display application (e.g., to free up computing resources) or the like. If the one or more executable scripts are determined, the flow chart proceeds to step 611. Otherwise, the flow chart proceeds to step 612.

As one example of an executable script predicted to improve a performance of one or more of a plurality of communication channels, a script may be configured to modify a quality of a remote desktop session. For example, a resolution, bitrate, bit depth, and/or audio quality of the remote desktop session may be lowered. In this way, the quality of the remote desktop session may be slightly impacted, but the consistency (e.g., latency) of the remote desktop session might be improved.

As one example of an executable script predicted to improve a performance of one or more of a plurality of communication channels, a script may be configured to modify execution of one or more applications executing in the remote desktop session. For example, one or more applications executing in the remote desktop session may be terminated. Additionally and/or alternatively, one or more applications executing in the remote desktop session may be modified to, e.g., use less bandwidth, use a simpler graphics mode, use fewer audio samples, use fewer colors, or the like.

As one example of an executable script predicted to improve a performance of one or more of a plurality of communication channels, a script may be configured to lower a bitrate of communications delivered via one or more of the plurality of communications channels. For example, the quality of audio in a videoconferencing application executing in a remote desktop session may be modified to lower the bitrate of the audio. Similarly, the quality of video in the same application might be modified to lower the bitrate of the video.

In step 611, the one or more executable scripts determined in step 610 may be transmitted. Transmitting the one or more executable scripts might comprise transmitting the scripts themselves, indications of the scripts (e.g., Uniform Resource Identifiers (URIs) which, when accessed, allow a computing device to download the script), or the like. If the computing device performing step 610 and step 611 is the same computing device that should execute the one or more executable scripts, then the transmission might comprise transmitting the scripts to an application and/or an operating system executing on the computing device that can execute the scripts. If the computing device performing step 610 and step 611 is different from the computing device that should execute the one or more executable scripts, then the one or more executable scripts (and/or the indications of the scripts) might be transmitted via a network.

In step 612, it may be determined whether one or more operating parameters of the remote desktop session may be modified to potentially improve a performance of one or more of the plurality of communication channels. The operating parameters may relate to, for example, a resolution of the remote desktop session, a bit depth of the remote desktop session, an audio bitrate of the remote desktop session, a number (e.g., a maximum number) of applications executing in the remote desktop session, whether the remote desktop session supports USB devices, whether the remote desktop session supports printing functionalities (e.g., color printing, high-fidelity printing), or the like. Modification of these parameters might relax the bandwidth requirements, latency requirements, or other operational requirements of one or more of the plurality of channels. For example, by lowering the resolution of a remote desktop session, then the bandwidth required by the video channel 501 might be lowered. Stated differently, by modifying the one or more operating parameters, the standard of performance metrics for one or more communication channels might be lowered. If one or more operating parameters of the remote desktop session may be modified to potentially improve a performance of one or more of the plurality of communication channels, then the flow chart may proceed to step 613. Otherwise, the flow chart may proceed to step 614.

Step 612 may employ use of a trained machine learning model. A machine learning model may be trained using training data that indicates performance metrics for a history of remote desktop sessions. The training data might indicate, for example, relative remote desktop session performances as compared to various operating parameters of the remote desktop sessions. The machine learning model may be trained to output, based on input data comprising the channel scores for a particular remote desktop session, one or more recommended modifications for the particular remote desktop session. Such recommended modifications might be to the one or more operating parameters to a remote desktop session. As such, step 612 may comprise receiving, from the machine learning model and based on the channel scores determined in step 604 through 607, one or more recommended modifications for the remote desktop session. Such modifications might comprise, for example, a modification of the operating parameters of the remote desktop session.

In step 613, an indication of the operating parameters determined in step 612 may be transmitted. For example, a notification may be displayed that encourages a user of a remote desktop session to lower the resolution of the remote desktop session. The indication may be transmitted to a server (e.g., the virtualization server 301) and may cause the virtualization server to modify one or more operating parameters of the remote desktop session. The indication may be additionally and/or alternatively transmitted to a client (e.g., the client computer 411) and may cause the client (e.g., via the remote session display application) to modify the operating parameters.

In step 614, it may be determined whether to send another type of notification. Such a notification may comprise a notification to an administrator (e.g., to warn the administrator that a remote desktop session is operating poorly). The notification may additionally and/or alternatively may comprise a notification to a user (e.g., to warn the user that the remote desktop session is performing poorly and that the user should use a local application and/or use a different server). If such a notification should be sent, the flow chart may proceed to step 615. Otherwise, the flow chart may end.

In step 615, the notification determined in step 614 may be transmitted. The transmission may be to a client computer (e.g., the client computer 411), a server (e.g., the virtualization server 401), or another computing device.

Any of the notifications transmitted above (e.g., in step 611, step 613, and/or step 615) might cause triggering of an adaptive measure. For example, transmission of a notification might comprise transmission of instructions which trigger performance (e.g., automatic performance) of an adaptive measure, such as modification of the operating parameters determined in step 612 and/or execution of one or more executable scripts determined in step 610. The transmission need not be from one computing device to another, and may be, e.g., a transmission from one application to another, a transmission within an application, or the like.

FIGS. 7A-7C are examples of notifications which might be provided to a user, in a user interface, as a result of the notifications transmitted in steps 611, 613, and/or 615. FIG. 7A depicts a first notification 701 which allows a user to decide whether to lower the resolution of their remote desktop session in order to improve performance. This notification may correspond to step 613 of FIG. 6. FIG. 7B depicts a second notification 702 which informs a user that background applications are being closed to improve remote desktop session performance. This notification may correspond to step 611 of FIG. 6. FIG. 7C depicts a third notification 703 which informs a user that a remote desktop session is performing poorly. This notification may correspond to step 615 of FIG. 6.

The following paragraphs (M1) through (M20) describe examples of methods that may be implemented in accordance with the present disclosure.

(M1) A method comprising receiving, from a computing device, channel metrics for each of a plurality of communication channels, wherein each of the plurality of communication channels is configured to deliver, to the computing device and via a network, a different aspect of a remote desktop session; determining a plurality of channel scores by, for each communication channel of the plurality of communication channels: determining, based on a portion of the channel metrics corresponding to the communication channel, a channel score that indicates a performance of the communication channel; and weighting the channel score based on a weighting value; determining, based on the plurality of channel scores, an aggregate score; and based on the aggregate score satisfying a threshold, transmitting a notification.

(M2) A method may be performed as described in paragraph (M1) wherein transmitting the notification comprises determining, based on the plurality of channel scores, one or more executable scripts predicted to improve a performance of one or more of the plurality of communication channels; and transmitting an indication of the one or more executable scripts.

(M2) A method may be performed as described in paragraph (M1) wherein transmitting the notification comprises: determining, based on the plurality of channel scores, one or more executable scripts predicted to improve a performance of one or more of the plurality of communication channels; and transmitting an indication of the one or more executable scripts.

(M3) A method may be performed as described in paragraph (M1) wherein transmitting the notification comprises: determining, based on the plurality of channel scores, one or more operating parameters of the remote desktop session which can be modified to improve a performance of one or more of the plurality of communication channels; and causing the computing device to display an indication of the one or more operating parameters.

(M4) A method may be performed as described in paragraph (M1) wherein at least one of the plurality of communication channels comprises one or more of: a Universal Serial Bus (USB) channel; or a printer channel.

(M5) A method may be performed as described in paragraph (M1) wherein determining the aggregate score is further based on a user experience score for the remote desktop session.

(M6) A method may be performed as described in paragraph (M1) further comprising: training, based on data that indicates performance metrics for a history of remote desktop sessions, a machine learning model to output, based on input data comprising one or more channel scores for a first remote desktop session, one or more recommended modifications for the first remote desktop session; and receiving, from the machine learning model and based on the plurality of channel scores, one or more first recommended modifications for the remote desktop session, wherein transmitting the notification comprises transmitting an indication of the one or more first recommended modifications.

(M7) A method may be performed as described in paragraph (M1) wherein the weighting value corresponds to an importance of the communication channel in providing the remote desktop session to a user.

(M8) A method may be performed as described in paragraph (M1) wherein the weighting value is based on a time period during which the remote desktop session is provided.

(M9) A method may be performed as described in paragraph (M1) wherein the weighting value is based on one or more applications executing in the remote desktop session.

(M10) A method may be performed as described in paragraph (M1) further comprising: determining user experience preferences associated with a user of the remote desktop session, wherein the weighting value is based on the user experience preferences.

(M11) A method may be performed as described in paragraph (M1) wherein determining the channel score comprises comparing the portion of the channel metrics corresponding to the communication channel to a standard of performance metrics for the communication channel.

(M12) A method may be performed as described in paragraph (M1) wherein each of the plurality of communication channels is a logical communication channel over the Internet.

(M13) A method may be performed as described in paragraph (M1) wherein the computing device is configured to collect the channel metrics using a remote session display application that displays the remote desktop session.

(M14) A method comprising receiving, from a computing device, channel metrics for each of a plurality of communication channels, wherein each of the plurality of communication channels is configured to deliver, to the computing device and via a network, a different aspect of a remote desktop session; determining a plurality of channel scores by, for each communication channel of the plurality of communication channels and based on a portion of the channel metrics corresponding to the communication channel, determining a channel score that indicates a performance of the communication channel; determining, based on the plurality of channel scores, one or more executable scripts predicted to improve a performance of one or more of the plurality of communication channels; and transmitting an indication of the one or more executable scripts.

(M15) A method may be performed as described in paragraph (M14) wherein the one or more executable scripts are configured to modify a quality of the remote desktop session.

(M16) A method may be performed as described in paragraph (M14) wherein the one or more executable scripts are configured to modify execution of one or more applications in the remote desktop session.

(M17) A method may be performed as described in paragraph (M14) wherein the one or more executable scripts are configured to lower a bitrate of communications delivered via one or more of the plurality of communication channels.

(M18) A method comprising receiving, from a computing device, channel metrics for each of a plurality of communication channels, wherein each of the plurality of communication channels is configured to deliver, to the computing device and via a network, a different aspect of a remote desktop session; determining a plurality of channel scores by, for each communication channel of the plurality of communication channels and based on a portion of the channel metrics corresponding to the communication channel, determining a channel score that indicates a performance of the communication channel; determining, based on the plurality of channel scores, one or more operating parameters of the remote desktop session which can be modified to improve a performance of one or more of the plurality of communication channels; and causing the computing device to display an indication of the one or more operating parameters.

(M19) A method may be performed as described in paragraph (M18) wherein the one or more operating parameters correspond to a resolution of the remote desktop session.

(M20) A method may be performed as described in paragraph (M18) wherein the one or more operating parameters correspond to a quantity of applications executing in the remote desktop session.

The following paragraphs (A1) through (A20) describe examples of apparatuses that may be implemented in accordance with the present disclosure.

(A1) An apparatus comprising one or more processors and memory storing instructions that, when executed by the one or more processors, cause the apparatus to: receive, from a computing device, channel metrics for each of a plurality of communication channels, wherein each of the plurality of communication channels is configured to deliver, to the computing device and via a network, a different aspect of a remote desktop session; determine a plurality of channel scores by, for each communication channel of the plurality of communication channels: determining, based on a portion of the channel metrics corresponding to the communication channel, a channel score that indicates a performance of the communication channel; and weighting the channel score based on a weighting value; determine, based on the plurality of channel scores, an aggregate score; and based on the aggregate score satisfying a threshold, transmit a notification.

(A2) An apparatus as described in paragraph (A1) wherein the instructions, when executed by the one or more processors, cause the apparatus to transmit the notification by causing the apparatus to determine, based on the plurality of channel scores, one or more executable scripts predicted to improve a performance of one or more of the plurality of communication channels; and transmit an indication of the one or more executable scripts.

(A2) An apparatus as described in paragraph (A1) wherein the instructions, when executed by the one or more processors, cause the apparatus to transmit the notification by causing the apparatus to determine, based on the plurality of channel scores, one or more executable scripts predicted to improve a performance of one or more of the plurality of communication channels; and transmit an indication of the one or more executable scripts.

(A3) An apparatus as described in paragraph (A1) wherein the instructions, when executed by the one or more processors, cause the apparatus to transmit the notification by causing the apparatus to determine, based on the plurality of channel scores, one or more operating parameters of the remote desktop session which can be modified to improve a performance of one or more of the plurality of communication channels; and cause the computing device to display an indication of the one or more operating parameters.

(A4) An apparatus as described in paragraph (A1) wherein at least one of the plurality of communication channels comprises one or more of: a Universal Serial Bus (USB) channel; or a printer channel.

(A5) An apparatus as described in paragraph (A1) wherein the instructions, when executed by the one or more processors, cause the apparatus to determine the aggregate score further based on a user experience score for the remote desktop session.

(A6) An apparatus as described in paragraph (A1) wherein the instructions, when executed by the one or more processors, cause the apparatus to: train, based on data that indicates performance metrics for a history of remote desktop sessions, a machine learning model to output, based on input data comprising one or more channel scores for a first remote desktop session, one or more recommended modifications for the first remote desktop session; and receive, from the machine learning model and based on the plurality of channel scores, one or more first recommended modifications for the remote desktop session, wherein transmitting the notification comprises transmitting an indication of the one or more first recommended modifications.

(A7) An apparatus as described in paragraph (A1) wherein the weighting value corresponds to an importance of the communication channel in providing the remote desktop session to a user.

(A8) An apparatus as described in paragraph (A1) wherein the weighting value is based on a time period during which the remote desktop session is provided.

(A9) An apparatus as described in paragraph (A1) wherein the weighting value is based on one or more applications executing in the remote desktop session.

(A10) An apparatus as described in paragraph (A1) wherein the instructions, when executed by the one or more processors, cause the apparatus to: determine user experience preferences associated with a user of the remote desktop session, wherein the weighting value is based on the user experience preferences.

(A11) An apparatus as described in paragraph (A1) wherein the instructions, when executed by the one or more processors, cause the apparatus to determine the channel score by causing the apparatus to compare the portion of the channel metrics corresponding to the communication channel to a standard of performance metrics for the communication channel.

(A12) An apparatus as described in paragraph (A1) wherein each of the plurality of communication channels is a logical communication channel over the Internet.

(A13) An apparatus as described in paragraph (A1) wherein the computing device is configured to collect the channel metrics using a remote session display application that displays the remote desktop session.

(A14) An apparatus comprising one or more processors and memory storing instructions that, when executed by the one or more processors, cause the apparatus to: receive, from a computing device, channel metrics for each of a plurality of communication channels, wherein each of the plurality of communication channels is configured to deliver, to the computing device and via a network, a different aspect of a remote desktop session; determine a plurality of channel scores by, for each communication channel of the plurality of communication channels and based on a portion of the channel metrics corresponding to the communication channel, determining a channel score that indicates a performance of the communication channel; determine, based on the plurality of channel scores, one or more executable scripts predicted to improve a performance of one or more of the plurality of communication channels; and transmit an indication of the one or more executable scripts.

(A15) An apparatus as described in paragraph (A14) wherein the one or more executable scripts are configured to modify a quality of the remote desktop session.

(A16) An apparatus as described in paragraph (A14) wherein the one or more executable scripts are configured to modify execution of one or more applications in the remote desktop session.

(A17) An apparatus as described in paragraph (A14) wherein the one or more executable scripts are configured to lower a bitrate of communications delivered via one or more of the plurality of communication channels.

(A18) An apparatus comprising one or more processors and memory storing instructions that, when executed by the one or more processors, cause the apparatus to: receive, from a computing device, channel metrics for each of a plurality of communication channels, wherein each of the plurality of communication channels is configured to deliver, to the computing device and via a network, a different aspect of a remote desktop session; determine a plurality of channel scores by, for each communication channel of the plurality of communication channels and based on a portion of the channel metrics corresponding to the communication channel, determining a channel score that indicates a performance of the communication channel; determine, based on the plurality of channel scores, one or more operating parameters of the remote desktop session which can be modified to improve a performance of one or more of the plurality of communication channels; and cause the computing device to display an indication of the one or more operating parameters.

(A19) An apparatus as described in paragraph (A18) wherein the one or more operating parameters correspond to a resolution of the remote desktop session.

(A20) An apparatus as described in paragraph (A18) wherein the one or more operating parameters correspond to a quantity of applications executing in the remote desktop session.

The following paragraphs (CRM1) through (CRM20) describe examples of computer-readable media that may be implemented in accordance with the present disclosure.

(CRM1) A non-transitory computer-readable medium storing instructions that, when executed, cause a system to: receive, from a computing device, channel metrics for each of a plurality of communication channels, wherein each of the plurality of communication channels is configured to deliver, to the computing device and via a network, a different aspect of a remote desktop session; determine a plurality of channel scores by, for each communication channel of the plurality of communication channels: determining, based on a portion of the channel metrics corresponding to the communication channel, a channel score that indicates a performance of the communication channel; and weighting the channel score based on a weighting value; determine, based on the plurality of channel scores, an aggregate score; and based on the aggregate score satisfying a threshold, transmit a notification.

(CRM2) A computer-readable medium as described in paragraph (CRM1) wherein the instructions, when executed, cause the system to transmit the notification by causing the system to determine, based on the plurality of channel scores, one or more executable scripts predicted to improve a performance of one or more of the plurality of communication channels; and transmit an indication of the one or more executable scripts.

(CRM2) A computer-readable medium as described in paragraph (CRM1) wherein the instructions, when executed, cause the system to transmit the notification by causing the system to determine, based on the plurality of channel scores, one or more executable scripts predicted to improve a performance of one or more of the plurality of communication channels; and transmit an indication of the one or more executable scripts.

(CRM3) A computer-readable medium as described in paragraph (CRM1) wherein the instructions, when executed, cause the system to transmit the notification by causing the system to determine, based on the plurality of channel scores, one or more operating parameters of the remote desktop session which can be modified to improve a performance of one or more of the plurality of communication channels; and cause the computing device to display an indication of the one or more operating parameters.

(CRM4) A computer-readable medium as described in paragraph (CRM1) wherein at least one of the plurality of communication channels comprises one or more of: a Universal Serial Bus (USB) channel; or a printer channel.

(CRM5) A computer-readable medium as described in paragraph (CRM1) wherein the instructions, when executed, cause the system to determine the aggregate score further based on a user experience score for the remote desktop session.

(CRM6) A computer-readable medium as described in paragraph (CRM1) wherein the instructions, when executed, cause the system to: train, based on data that indicates performance metrics for a history of remote desktop sessions, a machine learning model to output, based on input data comprising one or more channel scores for a first remote desktop session, one or more recommended modifications for the first remote desktop session; and receive, from the machine learning model and based on the plurality of channel scores, one or more first recommended modifications for the remote desktop session, wherein transmitting the notification comprises transmitting an indication of the one or more first recommended modifications.

(CRM7) A computer-readable medium as described in paragraph (CRM1) wherein the weighting value corresponds to an importance of the communication channel in providing the remote desktop session to a user.

(CRM8) A computer-readable medium as described in paragraph (CRM1) wherein the weighting value is based on a time period during which the remote desktop session is provided.

(CRM9) A computer-readable medium as described in paragraph (CRM1) wherein the weighting value is based on one or more applications executing in the remote desktop session.

(CRM10) A computer-readable medium as described in paragraph (CRM1) wherein the instructions, when executed, cause the system to: determine user experience preferences associated with a user of the remote desktop session, wherein the weighting value is based on the user experience preferences.

(CRM11) A computer-readable medium as described in paragraph (CRM1) wherein the instructions, when executed, cause the system to determine the channel score by causing the system to compare the portion of the channel metrics corresponding to the communication channel to a standard of performance metrics for the communication channel.

(CRM12) A computer-readable medium as described in paragraph (CRM1) wherein each of the plurality of communication channels is a logical communication channel over the Internet.

(CRM13) A computer-readable medium as described in paragraph (CRM1) wherein the computing device is configured to collect the channel metrics using a remote session display application that displays the remote desktop session.

(CRM14) A non-transitory computer-readable medium storing instructions that, when executed, cause a system to: receive, from a computing device, channel metrics for each of a plurality of communication channels, wherein each of the plurality of communication channels is configured to deliver, to the computing device and via a network, a different aspect of a remote desktop session; determine a plurality of channel scores by, for each communication channel of the plurality of communication channels and based on a portion of the channel metrics corresponding to the communication channel, determining a channel score that indicates a performance of the communication channel; determine, based on the plurality of channel scores, one or more executable scripts predicted to improve a performance of one or more of the plurality of communication channels; and transmit an indication of the one or more executable scripts.

(CRM15) A computer-readable medium as described in paragraph (CRM14) wherein the one or more executable scripts are configured to modify a quality of the remote desktop session.

(CRM16) A computer-readable medium as described in paragraph (CRM14) wherein the one or more executable scripts are configured to modify execution of one or more applications in the remote desktop session.

(CRM17) A computer-readable medium as described in paragraph (CRM14) wherein the one or more executable scripts are configured to lower a bitrate of communications delivered via one or more of the plurality of communication channels.

(CRM18) A non-transitory computer-readable medium storing instructions that, when executed, cause a system to: receive, from a computing device, channel metrics for each of a plurality of communication channels, wherein each of the plurality of communication channels is configured to deliver, to the computing device and via a network, a different aspect of a remote desktop session; determine a plurality of channel scores by, for each communication channel of the plurality of communication channels and based on a portion of the channel metrics corresponding to the communication channel, determining a channel score that indicates a performance of the communication channel; determine, based on the plurality of channel scores, one or more operating parameters of the remote desktop session which can be modified to improve a performance of one or more of the plurality of communication channels; and cause the computing device to display an indication of the one or more operating parameters.

(CRM19) A computer-readable medium as described in paragraph (CRM18) wherein the one or more operating parameters correspond to a resolution of the remote desktop session.

(CRM20) A computer-readable medium as described in paragraph (CRM18) wherein the one or more operating parameters correspond to a quantity of applications executing in the remote desktop session.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
receiving, from a computing device, channel metrics for each of a plurality of communication channels, wherein each of the plurality of communication channels is configured to deliver, to the computing device and via a network, a different aspect of a remote desktop session;
determining a plurality of channel scores by, for each communication channel of the plurality of communication channels:
determining, based on a portion of the channel metrics corresponding to the communication channel and a standard of performance metrics that defines, based on content provided via the remote desktop session, a level of performance of the communication channel, a channel score that indicates a performance of the communication channel; and weighting the channel score based on a weighting value;

determining, based on the plurality of channel scores, an aggregate score;

in response to the aggregate score satisfying a threshold, identifying, based on the plurality of channel scores, a first communication channel of the plurality of communication channels that does not satisfy a first standard of performance metrics that defines, based on content provided via the remote desktop session, a first level of performance of the first communication channel;

identifying, based on the first communication channel, one or more operating parameters that, when modified, are predicted to lower the first standard of performance metrics and thereby improve a first performance of the first communication channel;

selecting, based on the one or more operating parameters, one or more executable scripts that, when executed, modify the one or more operating parameters in a manner that is predicted to improve the first performance of the first communication channel; and causing the computing device to execute the one or more executable scripts so as to improve the performance of the remote desktop session, wherein the one or more executable scripts are configured to cause the computing device to close applications other than a remote session display application.

2. The method of claim 1, wherein the first communication channel comprises one or more of:
a Universal Serial Bus (USB) channel; or
a printer channel.

3. The method of claim 1, wherein determining the aggregate score is further based on a user experience score for the remote desktop session.

4. The method of claim 1, wherein the weighting value corresponds to an importance of the communication channel in providing the remote desktop session to a user.

5. The method of claim 1, wherein the first standard of performance metrics for the first communication channel are based on a resolution of video content being displayed in the remote desktop session.

6. The method of claim 1, wherein each of the plurality of communication channels is a logical communication channel over the Internet.

7. A method comprising:
receiving, from a computing device, channel metrics for each of a plurality of communication channels, wherein each of the plurality of communication channels is configured to deliver, to the computing device and via a network, a different aspect of a remote desktop session;

determining a plurality of channel scores by, for each communication channel of the plurality of communication channels:
determining, based on a portion of the channel metrics corresponding to the communication channel and a standard of performance metrics that defines, based on content provided via the remote desktop session, a level of performance of the communication channel, a channel score that indicates a performance of the communication channel; and weighting the channel score based on a weighting value;

determining, based on the plurality of channel scores, an aggregate score;

in response to the aggregate score satisfying a threshold, identifying, based on the plurality of channel scores, a first communication channel of the plurality of communication channels that does not satisfy a first standard of performance metrics that defines, based on content provided via the remote desktop session, a first level of performance of the first communication channel;

identifying, based on the first communication channel, one or more operating parameters that, when modified, are predicted to lower the first standard of performance metrics and thereby improve a first performance of the first communication channel;

selecting, based on the one or more operating parameters, one or more executable scripts that, when executed, modify the one or more operating parameters in a manner that is predicted to improve the first performance of the first communication channel;

causing the computing device to execute the one or more executable scripts so as to improve the performance of the remote desktop session; and causing the computing device to display an indication of the one or more operating parameters.

8. A method comprising:
receiving, from a computing device, channel metrics for each of a plurality of communication channels, wherein each of the plurality of communication channels is configured to deliver, to the computing device and via a network, a different aspect of a remote desktop session;

determining a plurality of channel scores by, for each communication channel of the plurality of communication channels:
determining, based on a portion of the channel metrics corresponding to the communication channel and a standard of performance metrics that defines, based on content provided via the remote desktop session, a level of performance of the communication channel, a channel score that indicates a performance of the communication channel; and weighting the channel score based on a weighting value;

determining, based on the plurality of channel scores, an aggregate score;

in response to the aggregate score satisfying a threshold, identifying, based on the plurality of channel scores, a first communication channel of the plurality of communication channels that does not satisfy a first standard of performance metrics that defines, based on content provided via the remote desktop session, a first level of performance of the first communication channel;

identifying, based on the first communication channel, one or more operating parameters that, when modified, are predicted to lower the first standard of performance metrics and thereby improve a first performance of the first communication channel;

selecting, based on the one or more operating parameters, one or more executable scripts that, when executed, modify the one or more operating parameters in a manner that is predicted to improve the first performance of the first communication channel;

causing the computing device to execute the one or more executable scripts so as to improve the performance of the remote desktop session;

training, based on data that indicates performance metrics for a history of remote desktop sessions, a machine learning model to output one or more recommended modifications for the remote desktop session; and receiving, from the machine learning model and based on input data comprising one or more first channel scores for the first communication channel, one or more first recommended modifications, wherein selecting the one or more executable scripts is based on the one or more first recommended modifications.

9. A method comprising:

receiving, from a computing device, channel metrics for each of a plurality of communication channels, wherein each of the plurality of communication channels is configured to deliver, to the computing device and via a network, a different aspect of a remote desktop session;

determining a plurality of channel scores by, for each communication channel of the plurality of communication channels:
  determining, based on a portion of the channel metrics corresponding to the communication channel and a standard of performance metrics that defines, based on content provided via the remote desktop session, a level of performance of the communication channel, a channel score that indicates a performance of the communication channel; and
  weighting the channel score based on a weighting value;

determining, based on the plurality of channel scores, an aggregate score;

in response to the aggregate score satisfying a threshold, identifying, based on the plurality of channel scores, a first communication channel of the plurality of communication channels that does not satisfy a first standard of performance metrics that defines, based on content provided via the remote desktop session, a first level of performance of the first communication channel;

identifying, based on the first communication channel, one or more operating parameters that, when modified, are predicted to lower the first standard of performance metrics and thereby improve a first performance of the first communication channel;

selecting, based on the one or more operating parameters, one or more executable scripts that, when executed, modify the one or more operating parameters in a manner that is predicted to improve the first performance of the first communication channel; and causing the computing device to execute the one or more executable scripts so as to improve the performance of the remote desktop session;

wherein the weighting value is based on a time period during which the remote desktop session is provided.

10. A method comprising:

receiving, from a computing device, channel metrics for each of a plurality of communication channels, wherein each of the plurality of communication channels is configured to deliver, to the computing device and via a network, a different aspect of a remote desktop session;

determining a plurality of channel scores by, for each communication channel of the plurality of communication channels:
  determining, based on a portion of the channel metrics corresponding to the communication channel and a standard of performance metrics that defines, based on content provided via the remote desktop session, a level of performance of the communication channel, a channel score that indicates a performance of the communication channel; and
  weighting the channel score based on a weighting value;

determining, based on the plurality of channel scores, an aggregate score;

in response to the aggregate score satisfying a threshold, identifying, based on the plurality of channel scores, a first communication channel of the plurality of communication channels that does not satisfy a first standard of performance metrics that defines, based on content provided via the remote desktop session, a first level of performance of the first communication channel;

identifying, based on the first communication channel, one or more operating parameters that, when modified, are predicted to lower the first standard of performance metrics and thereby improve a first performance of the first communication channel;

selecting, based on the one or more operating parameters, one or more executable scripts that, when executed, modify the one or more operating parameters in a manner that is predicted to improve the first performance of the first communication channel; and causing the computing device to execute the one or more executable scripts so as to improve the performance of the remote desktop session;

wherein the weighting value is based on one or more applications executing in the remote desktop session.

11. A method comprising:

receiving, from a computing device, channel metrics for each of a plurality of communication channels, wherein each of the plurality of communication channels is configured to deliver, to the computing device and via a network, a different aspect of a remote desktop session;

determining a plurality of channel scores by, for each communication channel of the plurality of communication channels:
  determining, based on a portion of the channel metrics corresponding to the communication channel and a standard of performance metrics that defines, based on content provided via the remote desktop session, a level of performance of the communication channel, a channel score that indicates a performance of the communication channel; and
  weighting the channel score based on a weighting value;

determining, based on the plurality of channel scores, an aggregate score;

in response to the aggregate score satisfying a threshold, identifying, based on the plurality of channel scores, a first communication channel of the plurality of communication channels that does not satisfy a first standard of performance metrics that defines, based on content provided via the remote desktop session, a first level of performance of the first communication channel;

identifying, based on the first communication channel, one or more operating parameters that, when modified, are predicted to lower the first standard of performance metrics and thereby improve a first performance of the first communication channel;

selecting, based on the one or more operating parameters, one or more executable scripts that, when executed, modify the one or more operating parameters in a manner that is predicted to improve the first performance of the first communication channel;

causing the computing device to execute the one or more executable scripts so as to improve the performance of the remote desktop session; and determining user experience preferences associated with a user of the remote desktop session, wherein the weighting value is based on the user experience preferences.

12. A method comprising:

receiving, from a computing device, channel metrics for each of a plurality of communication channels, wherein each of the plurality of communication channels is configured to deliver, to the computing device and via a network, a different aspect of a remote desktop session;

determining a plurality of channel scores by, for each communication channel of the plurality of communication channels:

determining, based on a portion of the channel metrics corresponding to the communication channel and a standard of performance metrics that defines, based on content provided via the remote desktop session, a level of performance of the communication channel, a channel score that indicates a performance of the communication channel; and weighting the channel score based on a weighting value;

determining, based on the plurality of channel scores, an aggregate score;

in response to the aggregate score satisfying a threshold, identifying, based on the plurality of channel scores, a first communication channel of the plurality of communication channels that does not satisfy a first standard of performance metrics that defines, based on content provided via the remote desktop session, a first level of performance of the first communication channel;

identifying, based on the first communication channel, one or more operating parameters that, when modified, are predicted to lower the first standard of performance metrics and thereby improve a first performance of the first communication channel;

selecting, based on the one or more operating parameters, one or more executable scripts that, when executed, modify the one or more operating parameters in a manner that is predicted to improve the first performance of the first communication channel; and causing the computing device to execute the one or more executable scripts so as to improve the performance of the remote desktop session;

wherein the computing device is configured to collect the channel metrics using a remote session display application that displays the remote desktop session.

* * * * *